No. 659,648.  
R. CHILLINGWORTH.  
SHEET METAL WHEEL.  
(Application filed July 18, 1899.)  
Patented Oct. 16, 1900.
(No Model.)
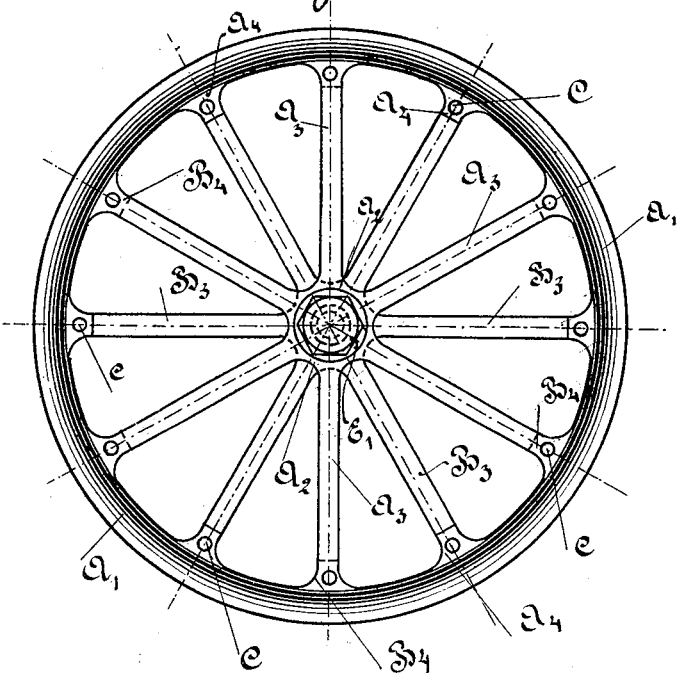
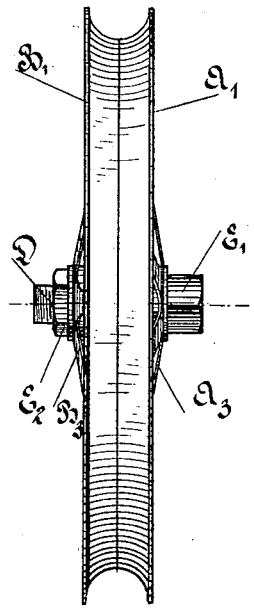
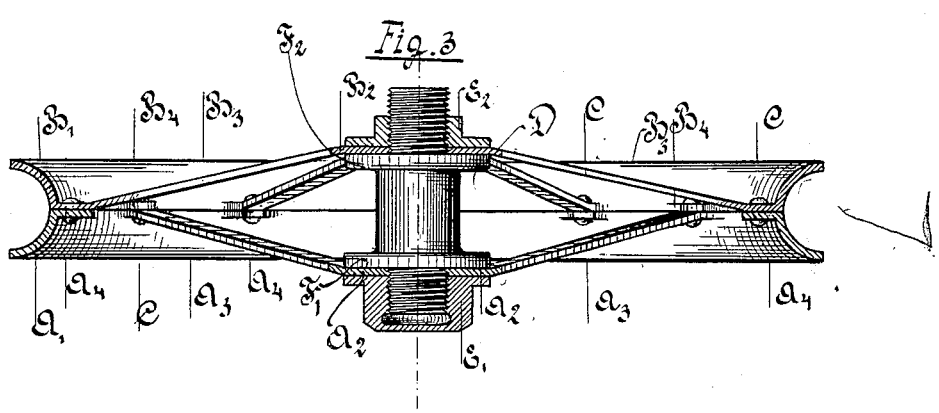
WITNESSES:
INVENTOR  
Rudolf Chillingworth  
BY  
ATTORNEYS

UNITED STATES PATENT OFFICE.

RUDOLF CHILLINGWORTH, OF NUREMBERG, GERMANY.

SHEET-METAL WHEEL.

SPECIFICATION forming part of Letters Patent No. 659,648, dated October 16, 1900.

Application filed July 18, 1899. Serial No. 724,323. (No model.)

*To all whom it may concern:*

Be it known that I, RUDOLF CHILLINGWORTH, a subject of the Emperor of Germany, residing at Nuremberg, Empire of Germany, have invented a certain new and useful Improved Sheet-Metal Wheel, of which the following is a full, clear, and exact description.

The present invention consists of a sheet-metal wheel formed in two exactly similar halves, one half comprising half the rim, half the spokes, and the corresponding part of the nave.

In order to render the present specification easily intelligible, reference is had to the accompanying drawings, in which similar letters of reference denote similar parts throughout the several views.

Figure 1 is a side elevation of the wheel; Fig. 2, an end elevation; and Fig. 3, a section through one of the center lines of the wheel, the latter view being drawn to a somewhat larger scale.

The wheel is formed of two similar halves, being divided along the center in the plane of the rim. Each half comprises half the rim A' or B', a central nave-disk $A^2$ or $B^2$, and half the number of spokes $A^3$ or $B^3$, the spokes of one half alternating with those of the other, as clearly shown at Fig. 3. The rim-half A' or B', its corresponding spokes $A^3$ or $B^3$, and nave-disk $A^2$ or $B^2$ are formed integral or of one piece of sheet metal, and between each of the spokes of each half lugs $A^4$ or $B^4$ are formed, to which the corresponding spokes of the opposite half are attached by means of rivets C. The hub D of the wheel is formed with flanges F' $F^2$ and extending ends, which are screw-threaded, as shown at Fig. 3. The nave-disks $A^2$ and $B^2$ are held in position against the said flanges by means of nuts E' and $E^2$, screwed onto the said threaded extensions.

From the foregoing description it will be clear that the strain is equally divided between each half of the wheel, so that the latter will be very strong and will not be subjected to any one-sided strains. The cross-section of the rim may be varied according to requirement.

I claim as my invention—

1. A sheet-metal wheel having two halves, said wheel being divided in a plane perpendicular to the axis, each half comprising a rim, a nave-disk and half the number of spokes and means for connecting together the two halves in the manner and for the purpose substantially as described.

2. A sheet-metal wheel divided into two halves in a plane perpendicular to the axis, each half comprising integrally half the rim, half the spokes and one nave-disk in the manner and for the purpose substantially as described.

3. A sheet-metal wheel consisting of two halves divided in a plane perpendicular to the axis and exactly similar to each other each half having half the total number of spokes, the spokes of the one half alternating with those of the other and a series of lugs on each half to correspond with the spokes of the companion half and means for attaching the spokes of each half to the lugs of the other half, a nave-disk to each half and means for connecting up the disks of each wheel-half in the manner and for the purpose substantially as described.

4. A divided wheel comprising two similar halves, said wheel being divided in a plane perpendicular to the axis, each having integral half the rim half the number of spokes and a central nave-disk, a hub having flanges and protruding threaded ends and nuts to screw onto the said threaded ends and clamp the nave-disks of the two halves between the flanges and said nuts substantially as described and for the purpose specified.

In witness whereof I have hereunto set my hand in presence of two witnesses.

RUDOLF CHILLINGWORTH.

Witnesses:
 ANDREAS STICH,
 OSCAR BOCK.